Feb. 27, 1934. V. ROYLE 1,949,084
TUBING MACHINE
Original Filed Jan. 19, 1929
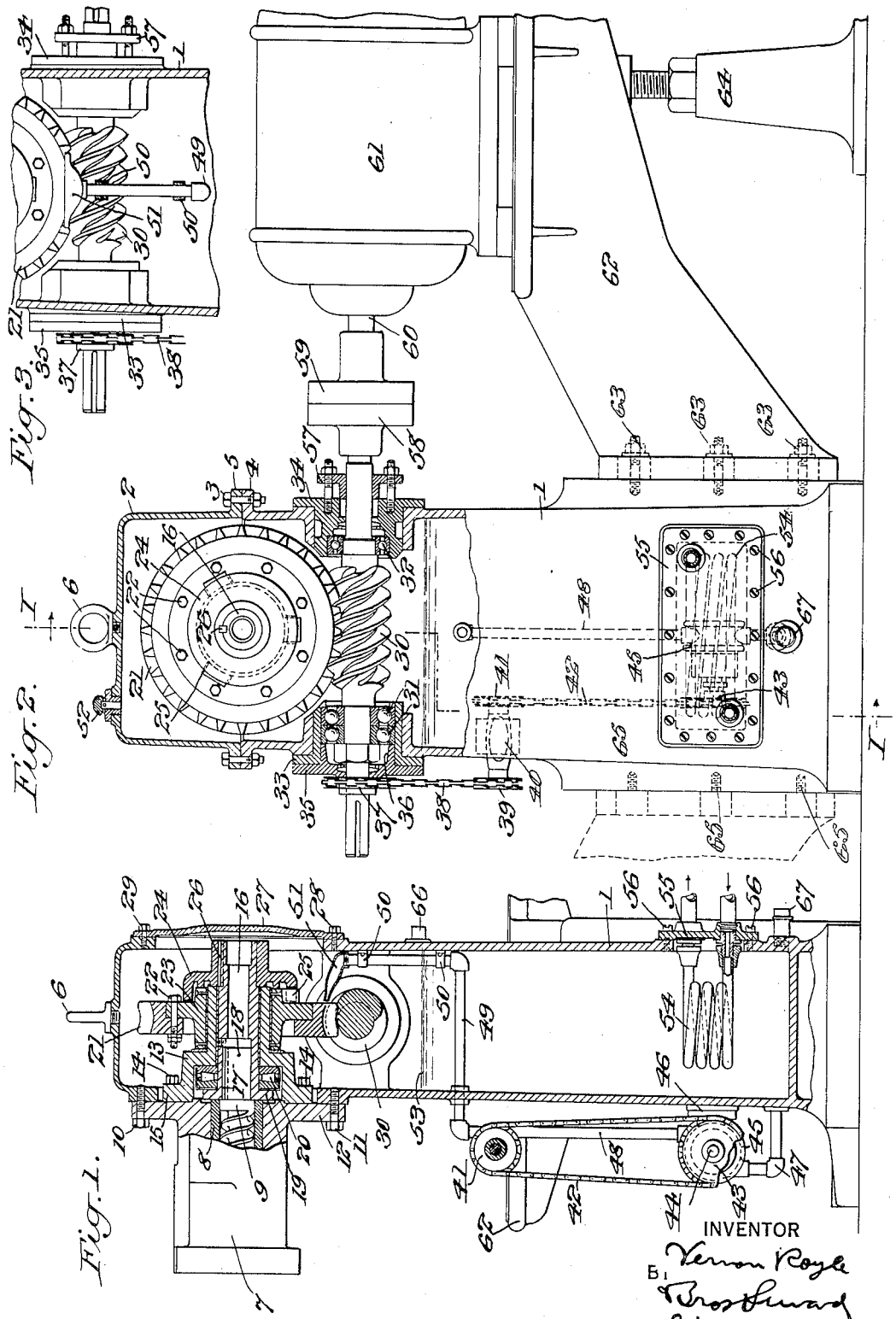
INVENTOR
Vernon Royle
By Bros Seward
his ATTORNEYS Patented Feb. 27, 1934

1,949,084

UNITED STATES PATENT OFFICE 1,949,084

TUBING MACHINE

Vernon Royle, Paterson, N. J.

Application January 19, 1929. Serial No. 333,706
Renewed January 20, 1934

6 Claims. (Cl. 18—12)

This invention relates to a tubing machine and contemplates such a structure in which the screw or plodder is directly driven by worm and gear.

An object is to provide such a machine in which the main driving parts are constantly and directly supplied with a jet of lubricant.

Another object consists in providing such a machine in which the motor supporting bracket arm may be secured at either side of the housing containing the drive mechanism, thereby facilitating and conveniencing installation and operation.

Another object consists in providing such a machine in which the thrust of the screw or plodder is received by a large roller bearing interposed between the screw and the driving gear.

Another object consists in providing such a machine in which the extruding head is directly mounted on the housing for the drive mechanism, instead of having a support of its own.

Another object consists in providing such a machine in which the housing itself constitutes a very large lubricant reservoir.

A further object consists in providing certain improvements in the form, construction and arrangement of the several parts whereby the above named and other objects may be effectively attained.

A practical embodiment of the invention is represented in the accompanying drawing, in which Fig. 1 represents a vertical section through the machine, partly in elevation and partly broken away, and taken substantially in the plane of the line I—I of Fig. 2, looking in the direction of the arrows;

Fig. 2 represents a similar view at right angles to Fig. 1; and

Fig. 3 represents a detail section, partly in elevation, showing the worm drive and lubricating spout.

The main housing of the machine is marked 1, and it has a cover 2 which is secured to the housing by bolts 3 that traverse mating flanges 4, 5, formed on and extending laterally from the housing and cover respectively. A ring 6 is fixed in the cover to facilitate its removal by suitable tackle or the like.

The extruding head of the machine is marked 7 and it has the usual bore liner 8 in which the screw or plodder 9 is mounted.

The head 7 is secured to the cover 2 and housing 1 by cap screws 10, 11, that pierce flange 12 on the head and are threaded in the cover and housing.

A sleeve 13 is fixed to the head 7 by cap screws 14 that pierce flange 15 on the sleeve and enter the flange 12 of the head. Reference to Fig. 1 will show that the sleeve 13 has two bores, one of greater diameter than the other, and that the exterior of the sleeve surrounding the smaller bore is also of reduced diameter.

A hollow drive shaft 16 is journaled within the smaller bore of sleeve 13, through the intermediation of an anti-friction liner, and the said shaft is splined, as indicated at 17, to the stub 18 of the screw 9. The adjacent part of the shaft 16 has a flange 19 that abuts the screw 9 and bore liner 8.

A large roller thrust bearing 20 is interposed between flange 19 of drive shaft 16 and one wall of the larger bore of sleeve 13, thereby receiving the operative thrust of the screw 9.

A worm gear 21 is fastened by bolts 22 to a hub 23 that has a bearing fit, through the intermediation of an anti-friction liner, upon the exterior of the reduced portion of sleeve 13. This mounting of the gear 21 enables it to be removed for replacement or repair as may be required. The hub 23 is in driving engagement with a spider 24, by means of lugs and recesses, as indicated at 25, and the said spider is keyed at 26 to the extremity of drive shaft 16.

A removable plate 27 which is attached to the housing 1 and cover 2 by cap screws 28, 29, provides for access to the parts just described and adjacent parts.

A worm 30 meshes with gear 21 and has its ends mounted in ball bearings 31, 32, which are supported in carriers 33, 34, that are fitted in openings formed in the housing 1. The carrier 33 supports a cover plate 35 that has a hub 36 entering within said carrier and abutting the outermost bearing 31. The said plate may be secured to the carrier by screws or in any other suitable manner.

A sprocket gear 37 is pinned to a protruding end of the worm 30 and is embraced by a chain 38 which also passes around sprocket 39 fixed on a short shaft that is journaled in bearing 40 carried by the housing 1. The other end of the said shaft supports another sprocket 41 which meshes with a chain 42 that engages sprocket 43 fixed on the pump shaft 44 that drives a suitable pump 45 which is supported at 46 on the side of the housing 1.

An inflow pipe 47 has one end in communication with the intake port of pump 45 and the other end tapped into the lower portion of the housing 1; while an outflow pipe 48 has one end in communication with the corresponding port of pump 45 and the other end jointed to piping 49 which enters the housing 1 and has an upstanding portion vertically supported by clips 50 fixed to the inside of the said housing. A broad ejecting spout or nozzle 51 is carried at the top of upstanding portion of pipe 49 and projects directly to the point of engagement between worm wheel 21 and worm 30. An oil filler 52 is set into the top of cover 2 and it is intended that the lower portion of housing 1 shall be filled to substantially the level indicated in Figs. 1 and 2 and marked 53, so that, when the machine is in operation, the rotation of worm 30 will actuate pump 45 and cause oil to be sucked through pipe 47 from the bottom of housing 1 and squirted through nozzle 51 on to the engaging parts of the worm and worm gear, from which point it will drip back into the body of lubricant in the housing.

In order to maintain the temperature of the oil or other lubricant at the desired point, a temperature controlling unit 54 is set in the lower part of the housing 1 and held in position by plate 55 that is fixed to the said housing by screws 56. It will be observed that the said temperature controlling unit consists of a coil pipe and the arrows on Fig. 1 indicate the ingress and egress of the temperature controlling medium, such as cold water, which may be forced through the unit 54 in an obvious manner from a suitable source, not shown.

In order to prevent leakage of oil or other lubricant thrown by the worm and gear in the direction of the longitudinal axis of the worm, a stuffing box 57 of conventional design is fitted in the carrier 34. The adjacent end of the worm 30 passes through said stuffing box and carries a clutch member 58 that mates with a corresponding member 59 on the shaft 60 of motor 61.

The motor 61 is mounted on a bracket arm 62 that has its inner end fastened to the housing 1 by bolt and slot connections 63. The outer end of the arm rests on an adjustable jack 64. This arrangement of the parts provides for accurate vertical adjustment of the motor with respect to the drive mechanism in order to maintain perfect alinement of the parts. The motor can be suitably mounted for lateral and rotary adjustment on the arm 62, in a well understood manner, for the same purpose.

It will be observed that the opposite side of the housing 1 is also fitted for bolt and slot connections with a bracket arm like bracket arm 62, as indicated at 65, and this enables the said bracket arm to be adjustably secured to either side of the said housing as the requirements of installation or convenience in operation may dictate. The jack 64 is, of course, movable, and it will be observed that the end of the worm 30 which protrudes through the carrier 33 has a key slot, plainly shown in Fig. 2, which is fitted to receive a clutch member corresponding to part 58. This provision of the machine is of some importance because floor requirements or the location of complementary machinery calls for the mounting of the motor in different positions and, furthermore, it is frequently practicable for a single operative to feed two machines, in which case the location of a motor between the two machines he is tending would seriously inconvenience him.

The worm 30 is intended to be rotated in the same direction, whether the motor be connected with its one end or the other, and the large ball bearings 31 serve to take up the thrust arising from the operative motion of the worm.

By keeping the oil or other lubricant level at the point marked 53, which is attained by an overflow 60, it will be seen that the driving parts, notably the worm, do not dip into the same, and this is of practical importance because the worm becomes quite hot in operation and would unnecessarily heat the lubricant if it were immersed in it. In spite of this arrangement, there is an ample supply of lubricant to the heavy driving parts by reason of the continuous action of pump 45 and the width and copious size of spout or nozzle 51. The gear 21 in its rotation tends to carry some lubricant upwardly and to drop the same or allow the same to trickle down to its hub and adjacent parts which are thereby lubricated through conventional orifices provided at the necessary or desired points. A drain plug 67, located at the base of the housing 1, enables the changing of the lubricant and cleaning of the reservoir when desired.

In addition to the adaptability of the machine for specific purposes or installations arising from the possibility of mounting the motor at either side, there is a feature looking in the same direction which consists in the direct application of the extruding head 7 to the housing 1 for the driving mechanism. This construction eliminates a separate pedestal or other support for the head 7 and thus condenses the size of the machine and its required floor space. The said extruding head is adapted to carry, at its outer extremity, the usual tube forming elements or strainer head, or the like, as the case may be; and, as the form and mode of attachment of the same constitute no part of this invention, they are neither shown nor described.

The operation of the device has been described, so far as necessary, in connection with the description of the mechanical construction, and will not be re-stated.

It is understood that various changes may be made in the form, construction and arrangement of the several parts without departing from the spirit and scope of my invention; and hence, I do not intend to be limited to the details herein shown and described except as they may be included in the claims.

What I claim is:

1. A tubing machine comprising, a hollow pedestal housing open at its upper end, a hollow cover removably secured to the open upper end of the housing, an extruding head secured in part to one vertical side wall of the cover and in part to the coincident side wall of the housing in position to overhang the housing, a screw within the head, and drive mechanism for the screw concealed within the cover and housing.

2. A tubing machine comprising, a hollow pedestal housing closed at its bottom to form an oil reservoir and open at its upper end, a hollow cover removably secured to the open upper end of the housing, an extruding head secured in part to one vertical side wall of the cover and in part to the coincident side wall of the housing in position to overhang the housing, a screw within the head, and drive mechanism for the screw disposed above the oil reservoir and concealed within the cover and housing.

3. A tubing machine comprising, a hollow pedestal housing open at its upper end, a hollow cover removably secured to the open upper end of the housing, an extruding head secured in part to one vertical side wall of the cover and in part to the coincident side wall of the housing in position to overhang the housing, a screw within the head, a sleeve fixed to the head and extending into the cover and housing, a drive shaft journaled in the sleeve for driving the screw, and a drive gear for the shaft, said gear being mounted to rotate on the sleeve.

4. A tubing machine comprising, a hollow pedestal housing open at its upper end, a hollow cover removably secured to the open upper end of the housing, an extruding head secured in part to one vertical side wall of the cover and in part to the coincident side wall of the housing in position to overhang the housing, a screw within the head, a sleeve fixed to the head and extending into the cover and housing, a drive shaft journaled in the sleeve for driving the screw, a thrust bearing housed in the sleeve between the screw and drive shaft, and a drive gear for the shaft, said gear being mounted to rotate on the sleeve.

5. A tubing machine comprising, a hollow pedestal housing open at its upper end, a hollow cover removably secured to the open upper end of the housing, an extruding head secured in part to one vertical side wall of the cover and in part to the coincident side wall of the housing in position to overhang the housing, a screw within the head, a sleeve fixed to the head and extending into the cover and housing, a drive shaft journaled in the sleeve for driving the screw, a thrust bearing housed in the sleeve between the screw and drive shaft, a worm gear mounted to rotate on the sleeve and connected to the drive shaft, and a worm journaled in the walls of the housing in position to engage the worm gear.

6. A tubing machine comprising, a hollow pedestal housing open at its upper end, a hollow cover removably secured to the open upper end of the housing, an extruding head secured in part to one vertical side wall of the cover and in part to the coincident side wall of the housing in position to overhang the housing, a screw within the head, a sleeve fixed to the head and extending into the cover and housing, a drive shaft journaled in the sleeve for driving the screw, a thrust bearing housed in the sleeve between the screw and drive shaft, a worm gear mounted to rotate on the sleeve and connected to the drive shaft, a worm journaled in the walls of the housing in position to engage the worm gear, and a source of power supported on one vertical side wall of the housing and coupled to the worm.

VERNON ROYLE.